US009279077B2

(12) United States Patent
Liang et al.

(10) Patent No.: US 9,279,077 B2
(45) Date of Patent: Mar. 8, 2016

(54) METHODS OF FORMING AND PLACING PROPPANT PILLARS INTO A SUBTERRANEAN FORMATION

(71) Applicant: Halliburton Energy Services, Inc., Houston, TX (US)

(72) Inventors: Feng Liang, Houston, TX (US); Philip D. Nguyen, Houston, TX (US); Christopher Parton, Houston, TX (US); Jeff Fleming, Duncan, OK (US); Jimmie D. Weaver, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 266 days.

(21) Appl. No.: 13/673,123

(22) Filed: Nov. 9, 2012

(65) Prior Publication Data

US 2014/0131041 A1    May 15, 2014

(51) Int. Cl.
*E21B 43/267* (2006.01)
*C09K 8/80* (2006.01)

(52) U.S. Cl.
CPC ..................................... *C09K 8/805* (2013.01)

(58) Field of Classification Search
CPC ......... E21B 43/267; C09K 8/805; C09K 8/80
USPC .......................... 166/280.2, 280.1, 278, 308.1
See application file for complete search history.

(56) References Cited

U.S. PATENT DOCUMENTS

| 4,585,064 | A | 4/1986 | Graham et al. | |
|---|---|---|---|---|
| 4,670,501 | A | 6/1987 | Dymond et al. | |
| 4,982,793 | A | 1/1991 | Holtmyer et al. | |
| 5,067,565 | A | 11/1991 | Holtmyer et al. | |
| 5,122,549 | A | 6/1992 | Holtmyer et al. | |
| 5,249,627 | A | 10/1993 | Harms et al. | |
| 5,501,274 | A * | 3/1996 | Nguyen et al. | 166/276 |
| 5,833,000 | A | 11/1998 | Weaver et al. | |
| 5,839,510 | A | 11/1998 | Weaver et al. | |
| 5,853,048 | A | 12/1998 | Weaver et al. | |
| 5,905,061 | A | 5/1999 | Patel | |
| 5,977,031 | A | 11/1999 | Patel | |
| 6,287,639 | B1 | 9/2001 | Schmidt et al. | |
| 6,311,773 | B1 | 11/2001 | Todd et al. | |
| 6,439,309 | B1 | 8/2002 | Matherly et al. | |
| 6,582,819 | B2 | 6/2003 | McDaniel et al. | |
| 6,677,426 | B2 | 1/2004 | Noro et al. | |
| 6,828,279 | B2 | 12/2004 | Patel et al. | |
| 7,066,258 | B2 * | 6/2006 | Justus et al. | 166/276 |
| 7,131,491 | B2 | 11/2006 | Blauch et al. | |
| 7,153,575 | B2 | 12/2006 | Anderson et al. | |
| 7,281,580 | B2 | 10/2007 | Parker et al. | |
| 7,281,581 | B2 | 10/2007 | Nguyen et al. | |
| 7,325,608 | B2 | 2/2008 | van Batenburg et al. | |
| 7,350,579 | B2 | 4/2008 | Gatlin et al. | |
| 7,392,847 | B2 | 7/2008 | Gatlin et al. | |
| 7,534,745 | B2 | 5/2009 | Taylor et al. | |
| 7,571,767 | B2 | 8/2009 | Parker et al. | |
| 7,581,590 | B2 * | 9/2009 | Lesko et al. | 166/280.1 |
| 7,645,723 | B2 | 1/2010 | Kirsner et al. | |
| 7,673,686 | B2 | 3/2010 | Nguyen et al. | |
| 7,696,131 | B2 | 4/2010 | Oyler et al. | |
| 7,819,192 | B2 | 10/2010 | Weaver et al. | |
| 7,825,074 | B2 | 11/2010 | Schmidt et al. | |
| 7,956,017 | B2 | 6/2011 | Gatlin et al. | |
| 8,003,579 | B2 | 8/2011 | Akarsu et al. | |
| 8,076,271 | B2 | 12/2011 | Blauch et al. | |
| 8,136,595 | B2 | 3/2012 | Weaver et al. | |
| 8,168,739 | B2 | 5/2012 | Kitamura et al. | |
| 8,261,833 | B2 | 9/2012 | Nguyen et al. | |
| 2004/0261995 | A1 | 12/2004 | Nguyen et al. | |
| 2005/0130848 | A1 * | 6/2005 | Todd et al. | 507/200 |
| 2005/0194137 | A1 * | 9/2005 | Nguyen et al. | 166/276 |
| 2006/0157243 | A1 * | 7/2006 | Nguyen | 166/280.2 |
| 2006/0196661 | A1 | 9/2006 | East et al. | |
| 2007/0187097 | A1 | 8/2007 | Weaver et al. | |
| 2007/0215354 | A1 * | 9/2007 | Rickman et al. | 166/295 |
| 2007/0289781 | A1 | 12/2007 | Rickman et al. | |
| 2008/0006405 | A1 | 1/2008 | Rickman et al. | |
| 2008/0202750 | A1 * | 8/2008 | Rediger et al. | 166/280.2 |
| 2010/0160187 | A1 | 6/2010 | Nguyen et al. | |
| 2010/0179281 | A1 | 7/2010 | Nilsen | |
| 2010/0263870 | A1 | 10/2010 | Willberg et al. | |
| 2011/0039737 | A1 | 2/2011 | Schmidt et al. | |
| 2011/0098394 | A1 | 4/2011 | Schmeltzer et al. | |
| 2013/0081813 | A1 * | 4/2013 | Liang et al. | 166/282 |

FOREIGN PATENT DOCUMENTS

WO     2014/074440 A1     5/2014

OTHER PUBLICATIONS

Gillard, et al., "A New Approach to Generating Fracture Conductivity," SPE 135034, 2010.
International Search Report and Written Opinion for PCT/US2013/068252 dated Dec. 30, 2013.

* cited by examiner

*Primary Examiner* — Doug Hutton, Jr.
*Assistant Examiner* — Silvana Runyan
(74) *Attorney, Agent, or Firm* — McDermott Will & Emery LLP; Craig W. Roddy

(57) ABSTRACT

Methods of treating a subterranean formation comprising placing a treatment fluid comprising a base fluid, proppant particulates, a consolidating agent, a thermoplastic material, and a degradable polyester material into the subterranean formation; coating the proppant particulates and the consolidating agent with the thermoplastic material and the degradable polyester material together so as to form proppant pillars; and degrading the degradable polyester material.

20 Claims, No Drawings

METHODS OF FORMING AND PLACING PROPPANT PILLARS INTO A SUBTERRANEAN FORMATION

BACKGROUND

The present invention relates to methods of forming and placing proppant pillars into a subterranean formation.

Subterranean wells (e.g., hydrocarbon producing wells, water producing wells, or injection wells) are often stimulated by hydraulic fracturing treatments. In traditional hydraulic fracturing treatments, a treatment fluid, which may also function simultaneously or subsequently as a carrier fluid, is pumped into a portion of a subterranean formation at a rate and pressure sufficient to break down the formation and create one or more fractures therein. Typically, particulate solids, such as graded sand, are suspended in a portion of the treatment fluid and then deposited into the fractures. These particulate solids, or "proppant particulates," serve to prevent the fractures from fully closing once the hydraulic pressure is removed. By keeping the fractures from fully closing, the proppant particulates aid in forming conductive paths through which fluids produced from the formation may flow.

The degree of success of a fracturing operation depends, at least in part, upon fracture porosity and conductivity once the fracturing operation is complete and production is begun. Traditional fracturing operations place a large volume of proppant particulates into a fracture to form a "proppant pack" in order to ensure that the fracture does not close completely upon removing the hydraulic pressure. The ability of proppant particulates to maintain a fracture open depends upon the ability of the proppant particulates to withstand fracture closure and, therefore, is typically proportional to the volume of proppant particulates placed in the fracture. The porosity of a proppant pack within a fracture is related to the interconnected interstitial spaces between abutting proppant particulates. Thus, the fracture porosity is closely related to the strength of the placed proppant particulates and often tight proppant packs are unable to produce highly conductive channels within a fracture, while reducing the volume of the proppant particulates is unable to withstand fracture closures.

One way proposed to combat the problems inherent in tight proppant packs involves the use of proppant pillars. As used herein, the term "proppant pillar" refers to a coherent body of consolidated proppant particulates that generally remain a coherent body and do not disperse into smaller bodies without the application of shear. Proppant pillars are comprised of a plurality of proppant particulates formed into a tight cluster and are capable of withstanding fracture closure pressures. The use of proppant pillars, therefore, may reduce or eliminate the likelihood of partial or complete fracture closure. The proppant pillars placed into a fracture do not abut together perfectly and therefore may achieve infinite conductivity channels (e.g., unobstructed pathways) for produced fluid flow. However, while proppant pillars can overcome the issues associated with tight proppant packs, in practice several issues may prevent their optimal performance. Specifically, while proppant pillars do not disperse into smaller bodies in the absence of shear, they often encounter shear when being placed into a subterranean formation, particularly when encountering fracture closure stresses. Thus, the proppant pillars may be of a sub-optimal size due to dispersion after fracture closure, such that they are unable to maintain fracture conductivity. Therefore, a method of forming and placing proppant pillars into a subterranean formation such that they do not disperse into smaller bodies may be of benefit to one of ordinary skill in the art.

SUMMARY OF THE INVENTION

The present invention relates to methods of forming and placing proppant pillars into a subterranean formation.

In some embodiments, the present invention provides a method of treating a subterranean formation comprising providing a treatment fluid comprising a base fluid, proppant particulates, a consolidating agent, a thermoplastic material, and a degradable polyester material; placing the treatment fluid into the subterranean formation; coating the proppant particulates and the consolidating agent with the thermoplastic material and the degradable polyester material together so as to form proppant pillars; and degrading the degradable polyester material.

In other embodiments, the present invention provides a method of treating a subterranean formation: providing a treatment fluid comprising a base fluid, proppant particulates, a consolidating agent, and a degradable polyester material; placing the treatment fluid into the subterranean formation; coating the proppant particulates and the consolidating agent with the degradable polyester material so as to form proppant pillars; and degrading the degradable polyester material.

In still other embodiments, the present invention provides a method of treating a subterranean formation having at least one fracture comprising: providing a treatment fluid comprising a base fluid, proppant particulates, a consolidating agent, and a thermoplastic material; placing the treatment fluid into the subterranean formation; and coating the proppant particulates and consolidating agent with the thermoplastic material and the degradable polyester material so as to form proppant pillars.

The features and advantages of the present invention will be readily apparent to those skilled in the art upon a reading of the description of the preferred embodiments that follows.

DETAILED DESCRIPTION

The present invention relates to methods of forming and placing proppant pillars into a subterranean formation.

The present invention provides methods of creating highly conductive channels in propped fractures using proppant pillars that remain a coherent body when exposed to most shear stresses within a subterranean formation. Specifically, the present invention provides methods of forming proppant pillars by adhering a thermoplastic material and/or a degradable polyester material onto proppant particulates with the use of a consolidating agent so as to form a proppant pillar stronger than traditional proppant pillars and, thus, able to withstand high fracture closure stresses. The proppant pillars are preferably formed in situ. In situ coating may allow the proppant pillars to conform to the shape and size of the fracture. The methods of the present invention may be utilized in vertical and horizontal drilled wells and in main wellbores or lateral wellbores.

In one embodiment, the present invention provides a method of treating a subterranean formation comprising providing a treatment fluid comprising a base fluid, proppant particulates, a consolidating agent, a thermoplastic material, and a degradable polyester material. The treatment fluid is introduced into the subterranean formation and the thermoplastic and degradable polyester material together adhere the proppant particulates by the consolidating agent so as to form proppant pillars. The degradable polyester material is then degraded. In other embodiments, the proppant pillars may be adhered to either the thermoplastic material alone or the degradable polyester material alone.

Any base fluid suitable for use in a stimulation or well operation may be used in the treatment fluid of the present invention. Suitable base fluids for use in conjunction with the present invention may include, but are not limited to, oil-based fluids, aqueous-based fluids, aqueous-miscible fluids, water-in-oil emulsions, or oil-in-water emulsions. Suitable oil-based fluids may include alkanes; olefins; aromatic organic compounds; cyclic alkanes; paraffins; diesel fluids; mineral oils; desulfurized hydrogenated kerosenes; and any combination thereof. Suitable aqueous-based fluids may include fresh water; saltwater (e.g., water containing one or more salts dissolved therein); brine (e.g., saturated salt water), seawater; and any combination thereof. Generally, the water may be from any source (e.g., produced aqueous fluids), provided that it does not contain components that adversely affect the stability and/or performance of the treatment fluid of the present invention. Suitable aqueous-miscible fluids may include, but are not limited to, alcohols; (e.g., methanol, ethanol, n-propanol, isopropanol, n-butanol, sec-butanol, isobutanol, and t-butanol); glycerins; glycols (e.g., polyglycols, propylene glycol, and ethylene glycol); polyglycol amines; polyols; any derivative thereof; any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate); any in combination with an aqueous-based fluid; and any combinations thereof. Suitable water-in-oil emulsions, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween. Examples of suitable invert emulsions include those disclosed in U.S. Pat. No. 5,905,061 entitled "Invert Emulsion Fluids Suitable for Drilling" filed on May 23, 1997, U.S. Pat. No. 5,977,031 entitled "Ester Based Invert Emulsion Drilling Fluids and Muds Having Negative Alkalinity" filed on Aug. 8, 1998, U.S. Pat. No. 6,828,279 entitled "Biodegradable Surfactant for Invert Emulsion Drilling Fluid" filed on Aug. 10, 2001, U.S. Pat. No. 7,534,745 entitled "Gelled Invert Emulsion Compositions Comprising Polyvalent Metal Salts of an Organophosphonic Acid Ester or an Organophosphinic Acid and Methods of Use and Manufacture" filed on May 5, 2004, U.S. Pat. No. 7,645,723 entitled "Method of Drilling Using Invert Emulsion Drilling Fluids" filed on Aug. 15, 2007, and U.S. Pat. No. 7,696,131 entitled "Diesel Oil-Based Invert Emulsion Drilling Fluids and Methods of Drilling Boreholes" filed on Jul. 5, 2007, each of which are incorporated herein by reference in their entirety. It should be noted that for water-in-oil and oil-in-water emulsions, any mixture of the above may be used including the water being and/or comprising an aqueous-miscible fluid.

The base fluids for use in the treatment fluids of the present invention may additionally be foamed or gelled. As used herein, the term "foam" refers to a two-phase composition having a continuous liquid phase and a discontinuous gas phase. In some embodiments, treatment fluids for use in conjunction with the present invention may comprise a base fluid, a gas, and a foaming agent.

Suitable gases for use in conjunction with the present invention may include, but are not limited to, nitrogen; carbon dioxide; air; methane; helium; argon; and any combinations thereof. One skilled in the art, with the benefit of this disclosure, will recognize the benefit of each gas. By way of non-limiting example, carbon dioxide foams may have deeper well capability than nitrogen foams because carbon dioxide emulsions have greater density than nitrogen gas foams so that the surface pumping pressure required to reach a corresponding depth is lower with carbon dioxide than with nitrogen. Moreover, the higher density may impart greater particulate or proppant transport capability, if necessary, up to about 12 lb of proppant per gallon of fracture fluid.

In some embodiments, the quality of the foamed treatment fluid may range from a lower limit of about 5%, 10%, 25%, 40%, 50%, 60%, or 70% gas volume to an upper limit of about 95%, 90%, 80%, 75%, 60%, or 50% gas volume, and wherein the quality of the foamed treatment fluid may range from any lower limit to any upper limit and encompass any subset therebetween. Most preferably, the foamed treatment fluid may have a foam quality from about 85% to about 95%, or about 90% to about 95%.

Suitable foaming agents for use in conjunction with the present invention may include, but are not limited to, cationic foaming agents, anionic foaming agents, amphoteric foaming agents, nonionic foaming agents, or any combination thereof. Nonlimiting examples of suitable foaming agents may include, but are not limited to, surfactants like betaines; sulfated or sulfonated alkoxylates; alkyl quarternary amines; alkoxylated linear alcohols; alkyl sulfonates; alkyl aryl sulfonates; C10-C20 alkyldiphenyl ether sulfonates; polyethylene glycols; ethers of alkylated phenol; sodium dodecylsulfate; alpha olefin sulfonates (e.g., sodium dodecane sulfonate, trimethyl hexadecyl ammonium bromide, and the like); any derivatives thereof; or any combinations thereof. Foaming agents may be included in foamed treatment fluids at concentrations ranging typically from about 0.05% to about 2% of the liquid component by weight (e.g., from about 0.5 to about 20 gallons per 1000 gallons of liquid).

In some embodiments, the treatment fluids of the present invention may comprise a base fluid, a gelling agent, a crosslinking agent, and/or a gel breaker. The gelling agents suitable for use in the present invention may comprise any substance (e.g., a polymeric material) capable of increasing the viscosity of the treatment fluid. In certain embodiments, the gelling agent may comprise one or more polymers that have at least two molecules that are capable of forming a crosslink in a crosslinking reaction in the presence of a crosslinking agent, and/or polymers that have at least two molecules that are so crosslinked (i.e., a crosslinked gelling agent). The gelling agents may be naturally-occurring gelling agents, synthetic gelling agents, or a combination thereof. The gelling agents also may be cationic gelling agents, anionic gelling agents, or a combination thereof. Suitable gelling agents include, but are not limited to, polysaccharides, biopolymers, and/or derivatives thereof that contain one or more of these monosaccharide units: galactose; mannose; glucoside; glucose; xylose; arabinose; fructose; glucuronic acid; or pyranosyl sulfate. Examples of suitable polysaccharides include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")); cellulose derivatives (e.g., hydroxyethyl cellulose, carboxyethylcellulose, carboxymethylcellulose, and carboxymethylhydroxyethylcellulose); xanthan; scleroglucan; succinoglycan; diutan; and any combinations thereof. In certain embodiments, the gelling agents comprise an organic carboxylated polymer, such as CMHPG.

Suitable synthetic polymers include, but are not limited to, 2,2'-azobis(2,4-dimethyl valeronitrile); 2,2'-azobis(2,4-dimethyl-4-methoxy valeronitrile); polymers and copolymers of acrylamide ethyltrimethyl ammonium chloride; acrylamide; acrylamido- and methacrylamido-alkyl trialkyl ammonium salts; acrylamidomethylpropane sulfonic acid; acrylamidopropyl trimethyl ammonium chloride; acrylic acid; dimethylaminoethyl methacrylamide; dimethylaminoethyl methacrylate; dimethylaminopropyl methacrylamide; dimethyldiallylammonium chloride; dimethylethyl acrylate; fumaramide; methacrylamide; methacrylamidopropyl trimethyl ammonium chloride; methacrylamidopropyldimethyl-n-dodecylammonium chloride; methacrylamidopropyldimethyl-n-octylammonium chloride; methacrylamidopropyltrimethylammonium chloride; methacryloylalkyl trialkyl ammonium salts; methacryloylethyl trimethyl ammonium chloride; methacrylylamidopropyldimethylcetylammonium chloride; N-(3-sulfopropyl)-N-methacrylamidopropyl-N,N-dimethyl ammonium betaine; N,N-dimethylacrylamide; N-methylacrylamide; nonylphenoxypoly(ethyleneoxy)ethylmethacrylate; partially hydrolyzed polyacrylamide; poly 2-amino-2-methyl propane sulfonic acid; polyvinyl alcohol; sodium 2-acrylamido-2-methylpropane sulfonate; quaternized dimethylaminoethylacrylate; quaternized dimethylaminoethylmethacrylate; any derivatives thereof; and any combinations thereof. In certain embodiments, the gelling agent comprises an acrylamide/2-(methacryloyloxy) ethyltrimethylammonium methyl sulfate copolymer. In certain embodiments, the gelling agent may comprise an acrylamide/2-(methacryloyloxy)ethyltrimethylammonium chloride copolymer. In certain embodiments, the gelling agent may comprise a derivatized cellulose that comprises cellulose grafted with an allyl or a vinyl monomer, such as those disclosed in U.S. Pat. Nos. 4,982,793, 5,067,565, and 5,122,549, the entire disclosures of which are incorporated herein by reference.

Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used as gelling agents.

The gelling agent may be present in the breakable gel fluids useful in the methods of the present invention in an amount sufficient to provide the desired viscosity. In some embodiments, the gelling agents (i.e., the polymeric material) may be present in an amount in the range of from about 0.1% to about 10% by weight of the treatment fluid. In certain embodiments, the gelling agents may be present in an amount in the range of from about 0.15% to about 2.5% by weight of the treatment fluid.

In those embodiments of the present invention where it is desirable to crosslink the gelling agent, the breakable gel fluid may comprise one or more crosslinking agents. The crosslinking agents may comprise a borate ion, a metal ion, or similar component that is capable of crosslinking at least two molecules of the gelling agent. Examples of suitable crosslinking agents include, but are not limited to, borate ions; magnesium ions; zirconium IV ions; titanium IV ions; aluminum ions; antimony ions; chromium ions; iron ions; copper ions; magnesium ions; and zinc ions. These ions may be provided by providing any compound that is capable of producing one or more of these ions. Examples of such compounds include, but are not limited to, ferric chloride; boric acid; disodium octaborate tetrahydrate; sodium diborate; pentaborates; ulexite; colemanite; magnesium oxide; zirconium lactate; zirconium triethanol amine; zirconium lactate triethanolamine; zirconium carbonate; zirconium acetylacetonate; zirconium malate; zirconium citrate; zirconium diisopropylamine lactate; zirconium glycolate; zirconium triethanol amine glycolate; zirconium lactate glycolate; titanium lactate; titanium malate; titanium citrate; titanium ammonium lactate; titanium triethanolamine; titanium acetylacetonate; aluminum lactate; aluminum citrate; antimony compounds; chromium compounds; iron compounds; copper compounds; zinc compounds; and combinations thereof. In certain embodiments of the present invention, the crosslinking agent may be formulated to remain inactive until it is "activated" by, among other things, certain conditions in the fluid (e.g., pH, temperature, etc.) and/or interaction with some other substance. In some embodiments, the activation of the crosslinking agent may be delayed by encapsulation with a coating (e.g., a porous coating through which the crosslinking agent may diffuse slowly, or a degradable coating that degrades downhole) that delays the release of the crosslinking agent until a desired time or place. The choice of a particular crosslinking agent will be governed by several considerations that will be recognized by one skilled in the art, including but not limited to the type of gelling agent included, the molecular weight of the gelling agent(s), the conditions in the subterranean formation being treated, the safety handling requirements, the pH of the treatment fluid, temperature, and/or the desired delay for the crosslinking agent to crosslink the gelling agent molecules.

When included, suitable crosslinking agents may be present in the breakable gel fluids useful in the methods of the present invention in an amount sufficient to provide the desired degree of crosslinking between molecules of the gelling agent. In certain embodiments, the crosslinking agent may be present in the breakable gel fluids of the present invention in an amount in the range of from about 0.005% to about 1% by weight of the treatment fluid. In certain embodiments, the crosslinking agent may be present in the breakable gel fluids of the present invention in an amount in the range of from about 0.05% to about 1% by weight of the treatment fluid. One of ordinary skill in the art, with the benefit of this disclosure, will recognize the appropriate amount of crosslinking agent to include in a breakable gel fluid of the present invention based on, among other things, the temperature conditions of a particular application, the type of gelling agents used, the molecular weight of the gelling agents, the desired degree of viscosification, and/or the pH of the breakable gel fluid.

The treatment fluids useful in the methods of the present invention also may include internal gel breakers such as enzyme, oxidizing, acid buffer, or delayed gel breakers. The gel breakers may cause the breakable gel fluids of the present invention to revert to thin fluids that can be produced back to the surface. In some embodiments, the gel breaker may be formulated to remain inactive until it is "activated" by, among other things, certain conditions in the fluid (e.g. pH, temperature, etc.) and/or interaction with some other substance. In some embodiments, the gel breaker may be delayed by encapsulation with a coating (e.g., a porous coatings through which the breaker may diffuse slowly, or a degradable coating that degrades downhole) that delays the release of the gel breaker. In other embodiments the gel breaker may be a degradable material (e.g., polylactic acid or polygylcolic acid) that releases an acid or alcohol in the presence of an aqueous liquid. In certain embodiments, the gel breaker used may be present in the treatment fluids in an amount in the range of from about 0.0001% to about 200% by weight of the gelling agent. One of ordinary skill in the art, with the benefit of this disclosure, will recognize the type and amount of a gel breaker to include in the breakable gel fluids of the present invention based on, among other factors, the desired amount of delay time before the gel breaks, the type of gelling agents used, the temperature conditions of a particular application, the desired rate and degree of viscosity reduction, and/or the pH of the treatment fluid.

The base fluids for use in the treatment fluids of the present invention may comprise an additive selected from the group consisting of a salt; a weighting agent; an inert solid; a fluid loss control agent; an emulsifier; a dispersion aid; a corrosion inhibitor; an emulsion thinner; an emulsion thickener; a viscosifying agent; a gelling agent; a crosslinking agent; a breaker; a foaming agent; a gas; a surfactant; a lost circulation material; a pH control additive; a biocide; a stabilizer; a chelating agent; a scale inhibitor; a gas hydrate inhibitor; a mutual solvent; an oxidizer; a reducer; a friction reducer; a clay stabilizing agent; and any combination thereof.

In some embodiments, the base fluid of the present invention and any additives may be used as a spacer fluid, such that the treatment fluids of the present invention are introduced into a subterranean formation intermittently between the spacer fluid. This may allow the proppant pillars to be placed in a more spaced fashion that without the use of the spacer fluid. One of ordinary skill in the art will recognize whether a spacer fluid should be used in a particular application of the methods disclosed herein.

Proppant particulates suitable for use in the methods of the present invention may be of any size and shape combination known in the art as suitable for use in a subterranean operation. Generally, where the chosen proppant is substantially spherical, suitable proppant particulates have a size in the range of from about 2 to about 400 mesh, U.S. Sieve Series. In some embodiments of the present invention, the proppant particulates have a size in the range of from about 8 to about 120 mesh, U.S. Sieve Series. A major advantage of using this method is there is no need for the proppant particulates to be sieved or screened to a particular or specific particle mesh size or particular particle size distribution, but rather a wide or broad particle size distribution can be used.

In some embodiments of the present invention it may be desirable to use substantially non-spherical proppant particulates. Suitable substantially non-spherical proppant particulates may be cubic, polygonal, fibrous, or any other non-spherical shape. Such substantially non-spherical proppant particulates may be, for example, cubic-shaped, rectangular-shaped, rod-shaped, ellipse-shaped, cone-shaped, pyramid-shaped, or cylinder-shaped. That is, in embodiments wherein the proppant particulates are substantially non-spherical, the aspect ratio of the material may range such that the material is fibrous to such that it is cubic, octagonal, or any other configuration. Substantially non-spherical proppant particulates are generally sized such that the longest axis is from about 0.02 inches to about 0.3 inches in length. In other embodiments, the longest axis is from about 0.05 inches to about 0.2 inches in length. In one embodiment, the substantially non-spherical proppant particulates are cylindrical having an aspect ratio of about 1.5 to 1 and about 0.08 inches in diameter and about 0.12 inches in length. In another embodiment, the substantially non-spherical proppant particulates are cubic having sides about 0.08 inches in length.

Proppant particulates suitable for use in the present invention may comprise any material suitable for use in subterranean operations. Suitable materials for these proppant particulates include, but are not limited to, sand; bauxite; ceramic materials; glass materials; polymer materials (such as ethylene-vinyl acetate or composite materials); polytetrafluoroethylene materials; nut shell pieces; cured resinous particulates comprising nut shell pieces; seed shell pieces; cured resinous particulates comprising seed shell pieces; fruit pit pieces; cured resinous particulates comprising fruit pit pieces; wood, composite particulates; and combinations thereof. Suitable composite particulates may comprise a binder and a filler material wherein suitable filler materials include silica; alumina; fumed carbon; carbon black; graphite; mica; titanium dioxide; barite; meta-silicate; calcium silicate; kaolin; talc; zirconia; boron; fly ash; hollow glass microspheres; solid glass; and combinations thereof. Suitable proppant particles for use in conjunction with the present invention may be any known shape of material, including substantially spherical materials; fibrous materials; polygonal materials (such as cubic materials); and combinations thereof.

The proppant particulates are included in the treatment fluids of the present invention with a consolidating agent. The consolidating agent of the present invention is used to adhere the thermoplastic material and/or degradable polyester material of the present invention to the proppant particulates. Upon reaching certain temperatures, the thermoplastic material and/or the degradable polyester material may become pliable and twist and change conformation so as to coat the proppant particulates adhered thereto by aid of the consolidating agent. The consolidating agent may additionally aid in binding various proppant particulates together to aid in forming proppant pillars. Any consolidating agent suitable for use in subterranean operations and capable of binding proppant particulates together such that the individual proppant particulates do not generally disperse without the presence of shear may be used in the methods of the present invention. Suitable consolidating agents may include, but are not limited to, non-aqueous tackifying agents; aqueous tackifying agents; emulsified tackifying agents; silyl-modified polyamide compounds; resins; crosslinkable aqueous polymer compositions; polymerizable organic monomer compositions; consolidating agent emulsions; zeta-potential modifying aggregating compositions; silicon-based resins; and binders. Combinations and/or derivatives of these also may be suitable. Nonlimiting examples of suitable non-aqueous tackifying agents may be found in U.S. Pat. Nos. 7,392,847, 7,350,579, 5,853,048; 5,839,510; and 5,833,000, the entire disclosures of which are herein incorporated by reference. Nonlimiting examples of suitable aqueous tackifying agents may be found in U.S. Pat. Nos. 8,076,271, 7,131,491, 5,249,627 and 4,670,501, the entire disclosures of which are herein incorporated by reference. Nonlimiting examples of suitable crosslinkable aqueous polymer compositions may be found in U.S. Patent Application Publication Nos. 2010/0160187 (pending) and U.S. Pat. No. 8,136,595 the entire disclosures of which are herein incorporated by reference. Nonlimiting examples of suitable silyl-modified polyamide compounds may be found in U.S. Pat. No. 6,439,309 entitled the entire disclosure of which is herein incorporated by reference. Nonlimiting examples of suitable resins may be found in U.S. Pat. Nos. 7,673,686; 7,153,575; 6,677,426; 6,582,819; 6,311,773; and 4,585,064 as well as U.S. Patent Application Publication No. and 2008/0006405 (abandoned) and U.S. Pat. No. 8,261,833, the entire disclosures of which are herein incorporated by reference. Nonlimiting examples of suitable polymerizable organic monomer compositions may be found in U.S. Pat. No. 7,819,192, the entire disclosure of which is herein incorporated by reference. Nonlimiting examples of suitable consolidating agent emulsions may be found in U.S. Patent Application Publication No. 2007/0289781 (pending) the entire disclosure of which is herein incorporated by reference. Nonlimiting examples of suitable zeta-potential modifying aggregating compositions may be found in U.S. Pat. Nos. 7,956,017 and 7,392,847, the entire disclosures of which are herein incorporated by reference. Nonlimiting examples of suitable silicon-based resins may be found in Application Publication Nos. 2011/0098394 (pending), 2010/0179281 (pending), and U.S. Pat. Nos. 8,168,739 and 8,261,833, the entire disclosures of which are herein incorporated by reference. Nonlimiting examples of suitable binders may be found in U.S. Pat. Nos. 8,003,579; 7,825,074; and 6,287,639, as well as U.S. Patent Application Publication No. 2011/0039737, the entire disclosures of which are herein incorporated by reference. It is within the ability of one skilled in the art, with the benefit of this disclosure, to determine the type and amount of consolidating agent to include in the methods of the present invention to achieve the desired results. The consolidating agent may be present in the treatment fluids of the present invention in an about from about 1% to about 5% by weight of the proppant particulate. In preferred embodiments, the consolidating agent may be present in the treatment fluids of the present invention from about 0.5% to about 10% by weight of the proppant particulate.

In some embodiments of the present invention, degradable particulates may be included in the treatment fluids such that they form a portion of the proppant pillar. Upon a triggering event, the degradable particulates may be degraded, leaving behind spaces in the proppant pillar that may enhance the conductivity of the propped fracture. It may desirable that the degradable particulate has similar particle size, shape, and specific gravity as those of the proppant particulates.

Suitable degradable particulates include oil-degradable polymers. Where such oil-degradable polymers are used, the oil-degradable polymers may be degraded by the produced fluids. Oil-degradable polymers that may be used in accordance with the present invention may be either natural or synthetic polymers. Some particular examples include, but are not limited to, polyacrylics; polyamides; and polyolefins such as polyethylene, polypropylene, polyisobutylene, and polystyrene. Other suitable oil-degradable polymers include those that have a melting point that is such that the oil-degradable polymer will melt or dissolve at the temperature of the subterranean formation in which it is placed such as a wax material.

In addition to oil-degradable polymers, other degradable particulates that may be used in conjunction with the present invention include, but are not limited to, degradable polymers; dehydrated salts; and/or mixtures of the two. As for degradable polymers, a polymer is considered to be "degradable" herein if the degradation is due to, in situ, a chemical and/or radical process such as hydrolysis, or oxidation. The degradability of a polymer depends at least in part on its backbone structure. For instance, the presence of hydrolyzable and/or oxidizable linkages in the backbone often yields a material that will degrade as described herein. The rates at which such polymers degrade are dependent on the type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how it degrades (e.g., temperature, presence of moisture, oxygen, microorganisms, enzymes, pH, and the like).

Suitable examples of degradable polymers that may be used in accordance with the present invention include polysaccharides such as dextran or cellulose; chitins; chitosans; proteins; poly(lactides); poly(glycolides); poly($\epsilon$-caprolactones); poly(hydroxybutyrates); poly(anhydrides); aliphatic or aromatic polycarbonates; poly(orthoesters); poly (amino acids); poly(ethylene oxides); and polyphosphazenes. Of these suitable polymers and polyanhydrides may be preferred.

Dehydrated salts may be used in accordance with the present invention as a degradable particulate. A dehydrated salt is suitable for use in the present invention if it will degrade over time as it hydrates. For example, a particulate solid anhydrous borate material that degrades over time may be suitable. Specific examples of particulate solid anhydrous borate materials that may be used include, but are not limited to, anhydrous sodium tetraborate (also known as anhydrous borax) and anhydrous boric acid. Other examples include organic or inorganic salts like acetate trihydrate.

Blends of certain degradable materials may also be suitable for use as a degradable particulate. One example of a suitable blend of materials is a mixture of poly(lactic acid) and sodium borate where the mixing of an acid and base could result in a neutral solution where this is desirable. Another example would include a blend of poly(lactic acid) and boric oxide. Other materials that undergo an irreversible degradation may also be suitable, if the products of the degradation do not undesirably interfere with either the conductivity of the fracture or production of any of the fluids from the subterranean formation.

In choosing the appropriate degradable material, one should consider the degradation products that will result. These degradation products should not adversely affect other operations or components and may even be selected to improve the long-term performance/conductivity of the propped fracture. The choice of degradable material also can depend, at least in part, on the conditions of the well (e.g., well bore temperature). For instance, lactides have been found to be suitable for lower temperature wells, including those within the range of 60° F. to 150° F., and polylactides have been found to be suitable for well bore temperatures above this range. Also, poly(lactic acid) may be suitable for higher temperature wells. Some stereoisomers of poly(lactide) or mixtures of such stereoisomers may be suitable for even higher temperature applications. Dehydrated salts may also be suitable for higher temperature wells.

In some embodiments, a preferable result is achieved if the degradable material degrades slowly over time as opposed to instantaneously. The slow degradation of the degradable material, in situ, helps to maintain the stability of the proppant matrix.

In some embodiments of the present invention, degradable particulates are included in the treatment fluids of the present invention from about 5% to about 25% by weight of the proppant particulates. In preferred embodiments, degradable particulates are included in the treatment fluids of the present invention from about 10% to about 20% by weight of the proppant particulates. One of ordinary skill in the art with the benefit of this disclosure will recognize an optimum concentration of degradable material that provides desirable values in terms of enhanced conductivity or permeability without undermining the stability of the high porosity fracture itself.

In some embodiments, the methods of the present invention provide a thermoplastic material and a degradable polyester material (referred to collectively herein as "coating material") that may be coated singly or in combination onto proppant particulates so as to form proppant pillars. The coating material may be capable of softening upon heating or upon encountering temperatures present in a particular subterranean formation such that the material may become tacky or adhesive and adhere and envelope to the proppant pillars. Thus, the coating material may be coated onto the proppant particulates so as to form proppant pillars in situ within the subterranean formation itself. The coating material is pliable such that it may twist and change conformation as it encounters uniaxial or biaxial stresses, which may enhance binding of the coating material to the proppant particulates so as to form proppant pillars. The consolidating agent used with the proppant particulates may also serve to encourage adherence of the coating material onto the proppant particulates so as to form proppant pillars. In some embodiments, the coating material is preferably hydrophobic, such that individual proppant pillars are isolated from other proppant pillars within the treatment fluid. Such isolation may aid in producing highly conductive channels within the fracture through which produced fluids may flow.

The thermoplastic material for use in the present invention may include any thermoplastic material suitable for use in a subterranean formation capable of pliability upon reaching a specific temperature. Suitable thermoplastic materials for use in the treatment fluids of the present invention include, but are not limited to, a polyolefin; a fluoropolymer; a polyimide; a polyamide; a polyurethane; a polysulfone; a polycarbonate; a polyacrylate; a polyacrylonitrile; a polyvinyl polymer; a cellulose; any derivatives thereof; any copolymers thereof; and any combinations thereof. Suitable polyolefins include, but are not limited to, polyethylene; polypropylene; and polybutylene. In some embodiments, the thermoplastic material is present in the treatment fluids of the present invention from about 0.1% to about 20% by weight of the proppant particulate. In preferred embodiments, the thermoplastic material is present in the treatment fluids of the present invention from about 1% to about 10% by weight of the proppant particulate.

The thermoplastic material may be of any size and shape suitable for use in a particular subterranean operation in accordance with the methods of the present invention. The thermoplastic material may be, for example, square-shaped; rectangular-shaped; flake-shaped; ribbon-shaped; circle-shaped; oval-shaped; triangle-shaped; cross-shaped; crescent-shaped; diamond shaped; platelet-shaped; or bead-shaped. In some embodiments, the thermoplastic material may be in the form of nano-particles. In other embodiments, the thermoplastic material used in the present invention may additionally be monolayered or multilayered thermoplastic sheets. Multilayered sheets of thermoplastic material for use in the present invention may include two or more different types of thermoplastic materials in order to vary the properties of the thermoplastic material or to enhance individual thermoplastic properties. For example, a multilayered thermoplastic material for use in the methods of the present invention may comprise a more tacky thermoplastic material and a readily pliable thermoplastic material such that adherence of the multilayered thermoplastic material to the proppant particulates is enhanced and a more stable proppant pillar is formed.

In some preferred embodiments, the thermoplastic material of the present invention is in the form of a ribbon from about 2.5 to about 250 µm thick, from about 0.4 to about 6.5 mm wide, and from about 5 to about 50 mm in length. In other preferred embodiments, the thermoplastic material of the present invention is in the form of a flake from about 2.5 to about 250 µm thick with a regular or irregular shape surface area in the range from about 2 to about 325 mm$^2$. The size of the thermoplastic material depends largely on its shape. One of ordinary skill in the art, with the benefit of this disclosure, will recognize the shape and size of the thermoplastic material to use in a particular application.

The degradable polyester that may be used alone or in combination with the thermoplastic material of the present invention may be any polyester suitable for use in subterranean operations, including natural and synthetic polyesters, as long as the polyester is degradable. Suitable degradable polyester materials include, but are not limited to, aliphatic polyester homopolymers; aliphatic polyester copolymers; semi-aromatic polyester copolymers; aromatic polyester copolymers; telechelic polyester oligomers; and any combinations thereof. Nonlimiting examples of aliphatic polyester homopolymers include, but are not limited to, polyglycolic acid; polylactic acid; and polycaprolactone. Nonlimiting examples of aliphatic polyester copolymers include, but are not limited to, polyethylene adipate and polyhydroxyalkanoate. Nonlimiting examples of semi-aromatic polyester copolymers include, but are not limited to, polyethylene terephthalate; polybutylene terephthalate; polytrimethylene terephthalate; and polyethylene naphthalate. A nonlimiting example of an aromatic copolymer includes, but is not limited to, vectran. Nonlimiting examples of telechelic oligomers include, but are not limited to, polycaprolactone diol and polyethylene adipate diol.

The biodegradable polyester material may be of any size and shape suitable for use in a particular subterranean operation in accordance with the methods of the present invention. Like the thermoplastic material of the present invention, the biodegradable polyester material may be, for example, square-shaped; rectangular-shaped; flake-shaped; ribbon-shaped; circle-shaped; oval-shaped; triangle-shaped; cross-shaped; crescent-shaped; diamond shaped; platelet-shaped; or bead-shaped. In some embodiments, the biodegradable polyester material may be in the form of nano-particles. In other embodiments, the biodegradable polyester material used in the present invention may additionally be monolayered or multilayered biodegradable polyester films. Multilayered films of biodegradable polyester material for use in the present invention may include two or more different types of biodegradable polyester materials in order to vary the properties of the biodegradable polyester material or to enhance individual biodegradable polyester properties. For example, a multilayered biodegradable polyester material for use in the methods of the present invention may comprise a more tacky biodegradable polyester material and a readily pliable biodegradable polyester material such that adherence of the multilayered biodegradable polyester material to the proppant particulates is enhanced and a more stable proppant pillar is formed. In some embodiments, the biodegradable polyester material is present in the treatment fluids of the present invention from about 0.01% to about 20% by weight of the proppant particulate. In preferred embodiments, the biodegradable polyester material is present in the treatment fluids of the present invention from about 1% to about 15% by weight of the proppant particulate.

The degradable polyester material may further comprise a plasticizer compatible with polyester. Suitable plasticizers may include, but are not limited to, a polyethylene glycol; a polyethylene oxide; an oligomeric lactic acid; a citrate ester (e.g., a tributyl citrate oligomer, a triethyl citrate, an acetyltributyl citrate, and an acetyltriethyl citrate); a glucose monoester; a partially fatty acid ester; a polyethylene monolaurate; a triacetin; a poly(ϵ-caprolactone); a poly(hydroxybutyrate); a glycerin-1-benzoate-2,3-dilaurate; a glycerin-2-benzoate-1,3-dilaurate; a bis(butyl diethylene glycol)adipate; an ethylphthalylethyl glycolate; a glycerin diacetate monocaprylate; a diacetyl monoacyl glycerol; a polypropylene glycol; an epoxy derivative of a polypropylene glycol; a poly (propylene glycol)dibenzoate; a dipropylene glycol dibenzoate; a glycerol; an ethyl phthalyl ethyl glycolate; a poly(ethylene adipate)distearate; a di-iso-butyl adipate; any derivatives thereof; and any combinations thereof. The plasticizer may aid in altering the glass transition temperature of the degradable polyester material such that it becomes pliable at a temperature different than if the degradable polyester material was used alone. The glass transition temperature may be altered based on the type and amount of plasticizer included in the treatment fluid. In some embodiments, the plasticizer may be present in the treatment fluids of the present invention having a degradable polyester material in an amount from about 0.25% to about 40% by weight of the degradable polyester material. In preferred embodiments, the plasticizer may be present in the treatment fluids of the present invention having a degradable polyester material in an amount from about 1% to about 5% by weight of the degradable polyester material.

The degradation of the biodegradable polyester materials of the present invention may depend on, upon other factors, the intrinsic property of the biodegradable polyester material (e.g., monomer structure, molecular weight, copolymer ratio, crystallinity, shape, and the like), pH, or temperature. In some embodiments, it may be preferable that the degradable polyester material degrades before production of the well begins. In some embodiments, it may be preferable that the biodegradable polyester material degrade slowly over time. One of ordinary skill in the art, with the benefit of this disclosure, will recognize the type of biodegradable polyester material to use for a particular application so as to achieve degradation in certain subterranean environments.

A major advantage of using this method is that as the biodegradable polyester material of the present invention degrades, acid is released from the biodegradable polyester material. The released acid may aid in or eliminate the need for filter cake cleanup operations. Filter cake cleanup is often problematic because operational constraints may preclude backflowing the well to remove residual or unwanted filter cake. Thus, the biodegradable polyester material may be used to clean the filter cake without requiring an additional filter cake cleanup step or may reduce amount of time and/or acid required to clean the filter cake.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method of treating a subterranean formation:
   providing a treatment fluid comprising a base fluid, proppant particulates, a consolidating agent, a thermoplastic material, and a degradable polyester material comprising a plasticizer in an amount from about 0.25% to about 40% by weight of the degradable polyester material,
      wherein both the thermoplastic material and the degradable polyester material are each separately multilayered such that the multilayered thermoplastic material comprises at least two thermoplastic material types prior to being coated onto the proppant particulates and the multilayered degradable polyester material comprises at least two degradable polyester material types prior to being coated onto the proppant particulates;
   placing the treatment fluid into the subterranean formation;
   coating the proppant particulates and the consolidating agent with the thermoplastic material and the degradable polyester material together so as to form proppant pillars; and
   degrading the degradable polyester material.

2. The method of claim 1, wherein the thermoplastic material is selected from the group consisting of a polyolefin; a fluoropolymer; a polyimide; a polyamide; a polyurethane; a polysulfone; a polycarbonate; a polyacrylate; a polyacrylonitrile; a polyvinyl polymer; a cellulose; any derivatives thereof; any copolymers thereof; and any combinations thereof.

3. The method of claim 1, wherein the degradable polyester material is selected from the group consisting of an aliphatic polyester homopolymer; an aliphatic polyester copolymer; a semi-aromatic polyester copolymer; an aromatic polyester copolymer; a telechelic polyester oligomer; and any combinations thereof.

4. The method of claim 1, wherein the thermoplastic material is present in an amount from about 0.1% to about 20% by weight of the proppant particulates.

5. The method of claim 1, wherein the degradable polyester material is present in an amount from about 0.01% to about 20% by weight of the proppant particulates.

6. The method of claim 1, wherein treatment fluid further comprises a degradable particulate.

7. The method of claim 6, wherein the degradable particulate is present in an amount from about 5% to about 25% by weight of the proppant particulates.

8. The method of claim 1, wherein the plasticizer is selected from the group consisting of a polyethylene glycol; a polyethylene oxide; an oligomeric lactic acid; a citrate ester; a glucose monoester; a partially fatty acid ester; a polyethylene monolaurate; a triacetin; a poly(e-caprolactone); a poly (hydroxybutyrate); a glycerin-1-benzoate-2,3-dilaurate; a glycerin-2-benzoate-1,3-dilaurate; a bis(butyl diethylene glycol)adipate; an ethylphthalylethyl glycolate; a glycerin diacetate monocaprylate; a diacetyl monoacyl glycerol; a polypropylene glycol; an epoxy derivative of a polypropylene glycol; a poly(propylene glycol)dibenzoate; a dipropylene glycol dibenzoate; a glycerol; an ethyl phthalyl ethyl glycolate; a poly(ethylene adipate)distearate; a di-iso-butyl adipate; any derivatives thereof; and any combinations thereof.

9. The method of claim 1, wherein the treatment fluid further comprises an additive selected from the group consisting of consisting of a salt; a weighting agent; an inert solid; a fluid loss control agent; an emulsifier; a dispersion aid; a corrosion inhibitor; an emulsion thinner; an emulsion thickener; a viscosifying agent; a gelling agent; a crosslinking agent; a breaker; a foaming agent; a gas; a surfactant; a lost circulation material; a pH control additive; a biocide; a stabilizer; a chelating agent; a scale inhibitor; a gas hydrate inhibitor; a mutual solvent; an oxidizer; a reducer; a friction reducer; a clay stabilizing agent; and any combination thereof.

10. A method of treating a subterranean formation having at least one fracture therein:
providing a treatment fluid comprising a base fluid, proppant particulates, a consolidating agent, a thermoplastic material, and a degradable polyester material comprising a plasticizer in an amount from about 0.25% to about 40% by weight of the degradable polyester material,
wherein both the thermoplastic material and the degradable polyester material are each separately multilayered such that the multilayered thermoplastic material comprises at least two thermoplastic material types prior to being coated onto the proppant particulates and the multilayered degradable polyester material comprises at least two degradable polyester material types prior to being coated onto the proppant particulates;
placing the treatment fluid into the subterranean formation;
coating the proppant particulates and the consolidating agent with the degradable polyester material so as to form proppant pillars;
propping open the at least one fracture with the proppant pillars; and
degrading the degradable polyester material.

11. The method of claim 10, wherein the degradable polyester material is selected from the group consisting of an aliphatic polyester homopolymer; an aliphatic polyester copolymer; a semi-aromatic polyester copolymer; an aromatic polyester copolymer; a telechelic polyester oligomer; and any combinations thereof.

12. The method of claim 10, wherein treatment fluid further comprises a degradable particulate.

13. The method of claim 10, wherein the degradable polyester material is present in an amount from about 0.01% to about 20% by weight of the proppant particulate.

14. The method of claim 10, wherein the plasticizer is selected from the group consisting of a polyalkylene etherl a glyceryl monostearate; a tributyl citrate; an octyl epoxy soyate; an epoxidized soybean oil; an epoxy tallate; an epoxidized linseed oil; a polyhydroxyalkanoate; a glycol; any derivatives thereof; and any combinations thereof.

15. A method of treating a subterranean formation having at least one fracture comprising:
providing a treatment fluid comprising a base fluid, proppant particulates, a consolidating agent, a thermoplastic material, and a degradable polyester material comprising a plasticizer in an amount from about 0.25% to about 40% by weight of the degradable polyester material,
wherein both the thermoplastic material and the degradable polyester material are each separately multilayered such that the multilayered thermoplastic material comprises at least two thermoplastic material types prior to being coated onto the proppant particulates and the multilayered degradable polyester material comprises at least two degradable polyester material types prior to being coated onto the proppant particulates;
placing the treatment fluid into the subterranean formation;
coating the proppant particulates and consolidating agent with the thermoplastic material and the degradable polyester material so as to form proppant pillars; and
propping open the at least one fracture with the proppant pillars.

16. The method of claim 15, wherein the thermoplastic material is selected from the group consisting of a polyolefin; a fluoropolymer; a polyimide; a polyamide; a polyurethane; a polysulfone; a polycarbonate; a polyacrylate; a polyacrylonitrile; a polyvinyl polymer; a cellulose; any derivatives thereof; any copolymers thereof; and any combinations thereof.

17. The method of claim 15, wherein the thermoplastic material is present in an amount from about 0.1% to about 20% by weight of the proppant particulate.

18. The method of claim 15, wherein treatment fluid further comprises a degradable particulate.

19. The method of claim 18, wherein the degradable particulate is present in an amount from about 5% to about 25% by weight of the proppant particulate.

20. The method of claim 10, wherein the degradable polyester material is selected from the group consisting of an aliphatic polyester homopolymer; an aliphatic polyester copolymer; a semi-aromatic polyester copolymer; an aromatic polyester copolymer; a telechelic polyester oligomer; and any combinations thereof.

* * * * *